United States Patent
Faivre et al.

(10) Patent No.: US 9,313,944 B1
(45) Date of Patent: Apr. 19, 2016

(54) SYSTEM AND METHOD FOR AGRICULTURE USING A SEED TAPE

(71) Applicant: CNH Industrial America LLC, New Holland, PA (US)

(72) Inventors: Stephen M. Faivre, Sycamore, IL (US); Pinakin Desai, Naperville, IL (US); Nate Taylor, Sycamore, IL (US); Kevin Monk, Shorewood, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/559,271

(22) Filed: Dec. 3, 2014

(51) Int. Cl.
| | |
|---|---|
| A01C 1/04 | (2006.01) |
| G06F 17/30 | (2006.01) |
| A01M 21/04 | (2006.01) |
| A01B 79/02 | (2006.01) |
| A01C 7/06 | (2006.01) |
| A01C 15/00 | (2006.01) |
| A01M 17/00 | (2006.01) |
| A01M 21/02 | (2006.01) |
| A01C 7/04 | (2006.01) |

(52) U.S. Cl.
CPC . *A01C 7/06* (2013.01); *A01B 79/02* (2013.01); *A01C 1/042* (2013.01); *A01C 7/048* (2013.01); *A01C 15/00* (2013.01); *A01M 17/00* (2013.01); *A01M 21/02* (2013.01); *A01M 21/043* (2013.01); *Y10S 111/90* (2013.01)

(58) Field of Classification Search
CPC ..... A01M 21/43; A01M 17/00; A01M 21/02; A01C 7/048; A01C 7/06; A01C 15/00; A01C 1/042; Y10S 111/90; A01B 79/02
USPC .......................... 701/50; 111/199, 900; 47/56
See application file for complete search history.

(56) References Cited

U.S. PATENT DOCUMENTS

| | | | |
|---|---|---|---|
| 6,272,405 B1 | 8/2001 | Kubota | |
| 6,679,338 B1 | 1/2004 | Tucker | |
| 7,975,632 B2 * | 7/2011 | Gogerty | A01C 7/04 |
| | | | 111/177 |
| 8,484,889 B2 | 7/2013 | Woo et al. | |
| 8,511,596 B2 * | 8/2013 | Anderson | A01G 25/02 |
| | | | 241/101.742 |
| 2013/0152836 A1 * | 6/2013 | Deppermann | A01C 7/048 |
| | | | 111/199 |
| 2013/0192134 A1 | 8/2013 | Deppermann et al. | |

FOREIGN PATENT DOCUMENTS

| | | |
|---|---|---|
| DE | 4234432 A1 | 4/1994 |
| WO | WO2005053375 | 6/2005 |
| WO | WO2009006733 | 1/2009 |
| WO | WO2009067754 | 6/2009 |

* cited by examiner

*Primary Examiner* — Russell Frejd

(74) *Attorney, Agent, or Firm* — Rebecca L. Henkel

(57) ABSTRACT

The invention provides an ability to determine a position of a growing plant in a field such that automated or semi-automated means can be deployed more effectively to provide plant maintenance processes during a natural crop cycle. A control system for an agricultural implement may detect detectable elements dispersed between seeds of a seed tape. The control system may determine at least one of a weed zone and a plant zone and may actuate a ground engaging device accordingly.

20 Claims, 3 Drawing Sheets

SYSTEM AND METHOD FOR AGRICULTURE USING A SEED TAPE

FIELD OF THE INVENTION

The invention relates generally to agriculture, and in particular, to a system and method for growing and harvesting plants using a seed tape including a plurality of agricultural seeds.

BACKGROUND OF THE INVENTION

In agriculture, seeds are typically planted in the ground with certain spacing between seeds according to seed types. As a result, when a seed germinates and becomes a plant, there will be adequate spacing between plants to accommodate harvesting. As some plants require more space to grow and be harvested than others, necessary spacing between seeds, and in turn, between plants, often differs. This serves to maximize the number of plants which may be grown in a given tract of land.

An improvement in such planting includes integrating seeds in a "seed tape" of a given length. Accordingly, seeds may be enshrined in the seed tape with exact separation distances between seeds such that adequate space to grow and be harvested is easily predetermined. In the field, a seed tape, which may be provided as a biodegradable roll, may be unrolled and buried in the ground to quickly and conveniently form planting row.

However, weeds may grow around the seeds and compete with the plants for nutrients and sunlight. Also, the seeds may require periodic tending after planting, such as applications of fertilizers, pesticides and/or other treatments. In addition, plants produced from the seeds may fall prey to insects or other pests. However, indiscriminately applying agricultural products in a field may be costly, ineffective and otherwise undesirable. Also, manual weeding and treatment processes can be time consuming and difficult.

SUMMARY OF THE INVENTION

Embodiments of the invention provide an ability to determine exact plant position of a growing plant in the field so automated or semi-automated means can be deployed more effectively in plant maintenance processes during its natural crop cycle. Embodiments also provide an ability to place seed or ancillary application material tape that is synchronized with seed tape placement. The application material tape may contain fertilizers, insecticides or any material that aids in development of the plant during its natural crop cycle. When a seed tape is placed in the ground, sensing elements may ensure and keep the operator informed of proper placement of the seed tape in the ground and proper operation of the planter.

Embedded sensing elements, such as Radio Frequency Identification (RFID) tags, magnets, and the like, at defined intervals in a seed tape may be used to accurately determine plant positions. Sensing elements may be embedded or otherwise disposed in/on the seed tape during manufacturing. Accordingly, when a seed tape is manufactured, the seed spacing between seeds in the seed tape is known ahead of time. For example, a sensing element may be disposed between every seed, or every group of seeds, with a constant and even spacing. The manufacturing process ensures the seed is placed at a known spacing in the seed tape to maintain plant spacing when the seed germinates and becomes a plant.

By knowing the exact plant position, automated means or processes may be employed during the crop growth cycle and controlled to act on the plant.

By accurately determining plant position, deployment of automated means may be aided to ensure that growing plants are not harmed when maintenance processes, such as weeding, fertilization, and the like, are executed. As a result, manual, labor-intensive processes may be minimized and potentially avoided.

Also, by sensing a sensed element, such as an RFID tag or a magnetic strip, using a sensor, an automated implement, such as a chemical applicator or a weeder, can be controlled to remove weeds between and around plants either in autonomous or semi-autonomous operation. Further reading sensors and determining of plant positions allows their use as "guidance markers," and thus autonomous operation of automated devices for plant maintenance. Mechanical devices can also be deployed in conjunction with sensed elements and determined plant locations to determine a guidance path to follow in a planting row.

According to one aspect of the invention, a control system for an agricultural implement for use with a seed tape including a plurality of seeds and a plurality of detectable elements dispersed between the seeds is provided. The control system may comprise: an electronic sensor for sensing a physical location of a first detectable element of the plurality of detectable elements of the seed tape and providing a resulting detection signal; a data structure storing a separation distance between at least one of seeds of the seed tape and detectable elements of the seed tape and storing a predetermined plant dimension for a seed of the seed tape; and a controller in communication with the electronic sensor and the data structure, wherein the controller is configured to determine at least one of a weed zone between seeds and a plant zone from a seed based on the receiving the detection signal from the electronic sensor and reading the separation distance and the predetermined plant dimension from the data structure, and wherein the controller is configured to actuate a ground engaging device in the at least one of a weed zone and a plant zone.

The electronic sensor may sense detectable elements located at midpoints between seeds, and/or detectable elements located between groups of seeds.

The electronic sensor may be a Radio Frequency Identification (RFID) interrogator that senses detectable elements that are RFID tags, or may be magnetometer that senses detectable elements that are magnets.

The controller may be configured to indicate a location of the at least one of a weed zone and a plant zone via a visual display.

The system may further comprise a dispenser for an agricultural product that is in communication with the controller, and the dispenser may be controlled to dispense a fertilizer or a pesticide in the plant zone, and/or an herbicide in the weed zone.

The system may further comprise a mechanical instrument for removing weeds, which may be activated only in the weed zone.

An agricultural implement and a method for agriculture using a seed tape are also provided.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1A:
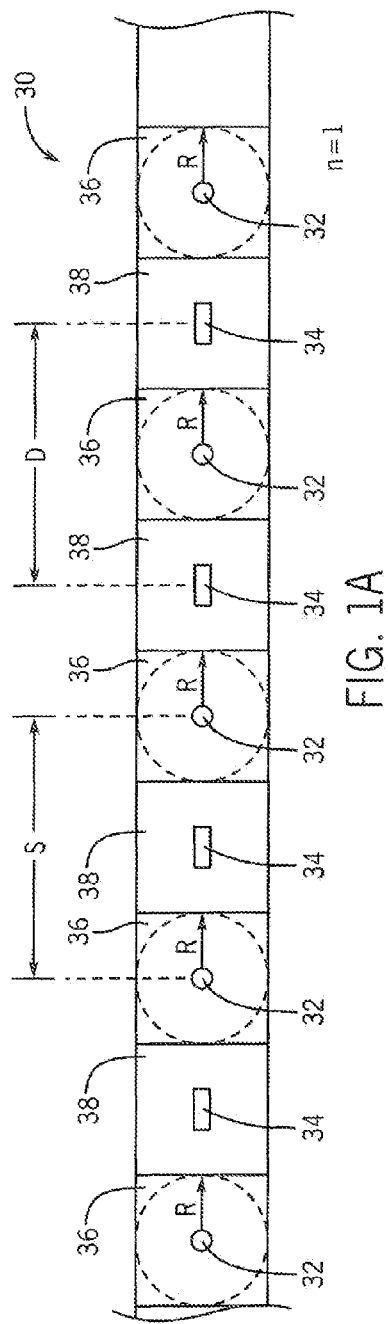
FIG. 1A illustrates a seed tape including a plurality of agricultural seeds and a plurality of detectable elements dispersed between seeds in accordance with one aspect of invention.

Referring now to the drawings and specifically to FIG. 1A, aspects of the present invention will now be described by way of a seed tape 30 in accordance with one aspect of the present invention. The seed tape 30 may include a plurality of agricultural seeds 32 and a plurality of detectable elements 34, or sensing elements, dispersed between the seeds 32. The seed tape 30 may be manufactured as a biodegradable roll with the seeds 32 and the detectable elements 34 integrated in the seed tape 30. Depending on the seed type, the seeds 32 are separated by a particular separation distance "S," and the detectable elements 34 are similarly separated by a separation distance "D."

As depicted, a single seed 32 may be followed by a single detectable element 34, which pattern may be repeated along the seed tape 30. Accordingly, the separation distance S could equal the separation distance D (offset), and the detectable elements 34 could be located at midpoints between the seeds 32.

In addition, also depending on the seed type, each seed 32 is allotted a predetermined plant dimension "R" for optimal plant growth. The predetermined plant dimensions "R," which could be a radius around the seed 32, operatively define plant zones 36 for the seeds 32. In turn, the space left between plant zones 36 operatively define weed zones 38. In other words, plant zones 36 are areas reserved for desirable plant growth, which may be treated in a growth encouraging fashion, and weed zones 38 are areas that are not reserved for plant growth, which may be treated in a growth inhibiting fashion. Weed zones 38 provide space for cultivating and/or harvesting plants in the field. Seed tapes 30 may be unrolled and buried in the ground manually, or alternatively, by an agricultural implement, by unfurling the seed tape to quickly and conveniently form planting rows.

Figure 1B:
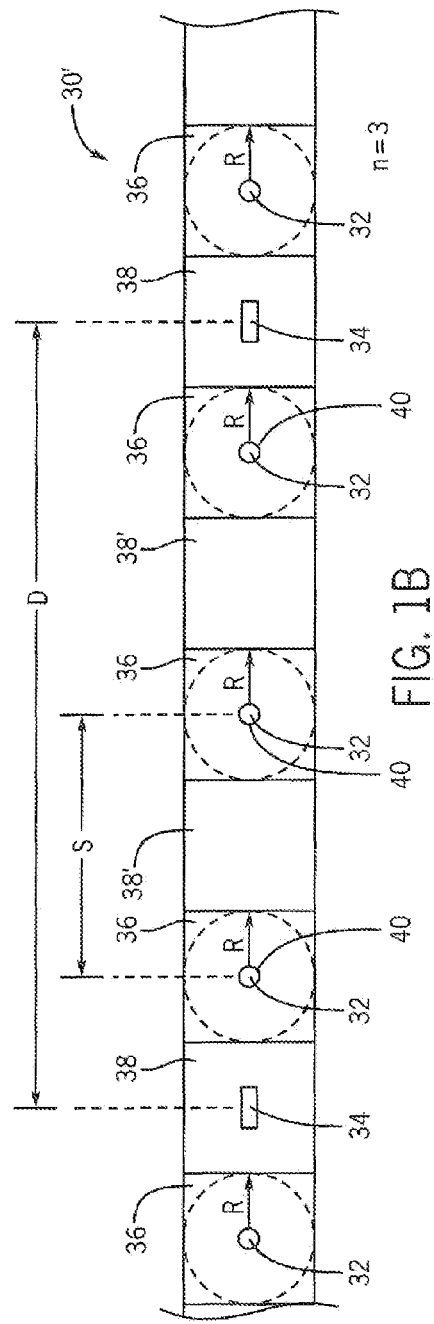
FIG. 1B illustrates an alternate seed tape including a plurality of agricultural seeds and a plurality of detectable elements dispersed between the seeds in accordance with one aspect of invention.

Referring now to FIG. 1B, in another aspect of the invention, seed tape 30', a group of seeds 40 followed by a single detectable element 34 may be repeated along the seed tape 30'. Here, the separation distance S (between the seeds 32) may be less than the separation distance D (between the detectable elements 34). The group of seeds 40 may include "n" number of seeds, such as a group of three seeds shown in FIG. 2B. The detectable elements 34 may still be located at midpoints between two particular seeds 32 when placed between groups of seeds 40. Like the embodiment of FIG. 1A, predetermined plant dimensions R may operatively define plant zones 36, and spaces left between plant zones 36 may operatively define weed zones 38. As a result of detectable elements 34 between groups of seeds 40, some weed zones 38 include detectable elements 34, while other weed zones 38' do not include detectable elements. Alternative embodiments may provide groups of seeds 40 of varying numbers, such as n=1 (as shown in FIG. 1A), n=2, n=3 (as shown in FIG. 1A), and so forth.

Figure 2:
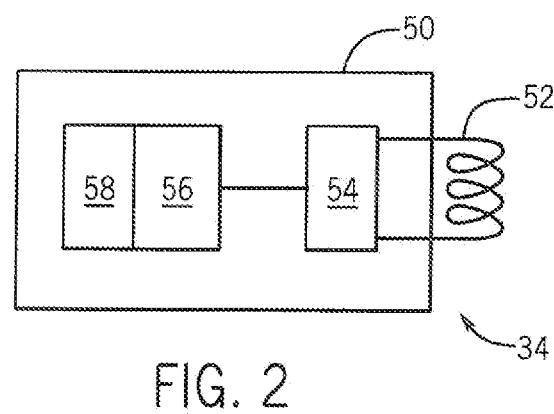
FIG. 2 illustrates a detectable element that is an RFID tag seeds in accordance with one aspect of invention.

Referring now to FIG. 2, the detectable element 34 could take the form of an RFID tag 50. The RFID tag 50 may be a passive transponder device with a pickup coil 52 coupled to front end circuitry 54, which is, in turn, coupled to logic 56 and a non-volatile memory 58. Upon being energized by an electromagnetic field produced by an electronic sensor, as provided in FIG. 4, which may be an RFID interrogator, the pickup coil 52 produces a current to the front end circuitry 54, which, in turns, rectifies power for the RFID tag 50 and components thereof. The logic 56 may then transmit a signal to the RFID interrogator via the front end circuitry 54 and the pickup coil 52 as understood in the art. The strength of the signal may be sensed by the electronic sensor for determining a physical location of the RFID tag 50.

Figure 4:
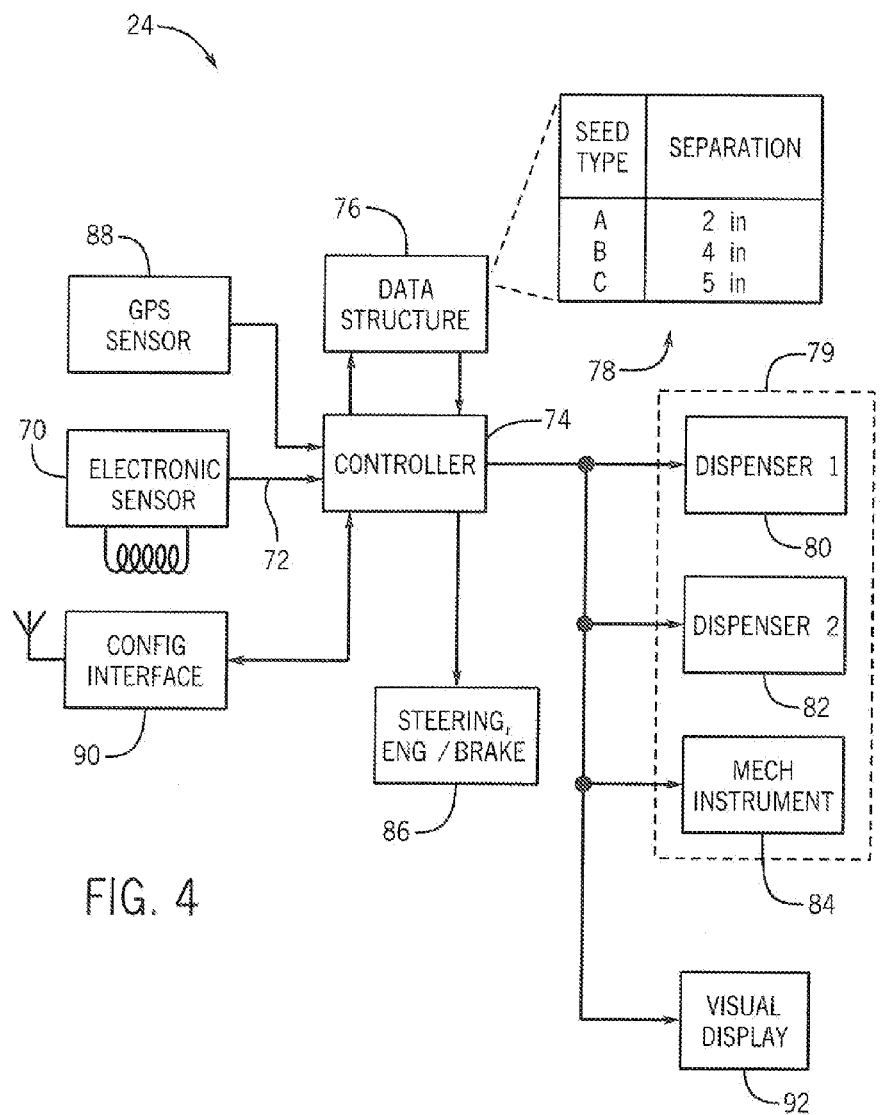
FIG. 4 illustrates a logical representation of a control system for an agricultural implement in accordance with one aspect of the present invention.

In addition, the logic 56 may read data stored in the memory 58 and transmit the data to the electronic sensor as provided in FIG. 4. For example, the logic 56 may read from the memory 58 and transmit to the electronic sensor of FIG. 4 a unique identification number, or a user programmable number, for identifying the particular RFID tag 50 and distinguishing the RFID tag 50 from other RFID tags. Also, the logic 56 may read from the memory 58 and transmit to the electronic sensor of FIG. 4 information about the seed tape 30 and/or the seeds 32, such as a separation distance S, a separation distance D, a predetermined plant dimension R, a seed type, a date/time stamp (such as the date/time of manufacture or planting), and so forth.

Figure 3:
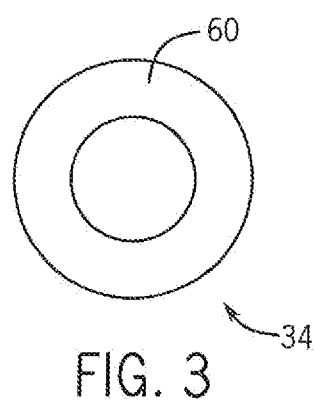
FIG. 3 illustrates a detectable element that is a magnet seeds in accordance with one aspect of invention.

Alternatively, referring now to FIG. 3, the detectable element 34 could take the form of a magnet 60. The magnet 60 may be a permanent magnet, which may be fabricated from neodymium or other suitable material, an electromagnet energized by the electronic sensor of FIG. 4, or the like. Accordingly, the electronic sensor may include a magnetometer of various types as understood in the art.

Referring now to FIG. 4, a system 24 is provided which may be used by an agricultural implement, such as a wheeled assembly towed behind a tractor. The system 24 includes an electronic sensor 70, which may be an RFID interrogator, magnetometer, or otherwise, for sensing physical locations of detectable elements 34 of the seed tape 30. Accordingly, the electronic sensor 70 provides a resulting detection signal 72 to a controller 74, which may be a microcontroller, microprocessor, Programmable Logic Device (PLD), Field Programmable Gate Array (FPGA), or other implemented logic. Accordingly, the detection signal 72 may indicate to the controller 74 the proximity of detectable elements 34 based the field strength sensed by the electronic sensor 70.

The detection signal 72 may also provide to the controller 74 data transmitted by the detectable elements 34, such as a unique identification number, a user programmable number, a separation distance S, a separation distance D, a predetermined plant dimension R, a seed type, a date/time stamp, and so forth. If so provided, the controller 74 may store such information in a data structure 76 for subsequent computation and use.

Next, the controller 74 is configured to access the data structure 76 storing information related to the seed tape 30, such as a separation distance S, a separation distance D, a predetermined plant dimension R, a seed type, a date/time stamp, and so forth. The data structure 76 may also include a look up table 78 or similar structure which includes a plurality of seed types, such as seed types "A," "B" and "C," and corresponding parameters for seed tapes implementing those seed types, such as separation distances S and/or predetermined plant dimensions D.

Accordingly, based on receiving the detection signal 72, reading the separation distance between seeds and/or detectable elements, predetermined plant dimension for a particular seed tape, and/or group of seeds n, the controller 74 is configured to execute to calculate and determine a weed zone 38 between seeds and/or a plant zone 36 from a seed for a seed tape 30. For example, with detectable elements 34 fixed at midpoints between seeds, the controller 74 could calculate the locations of plant zones 36 based on detecting detectable elements 34 and applying aforementioned parameters. The controller 74 may execute a program stored in a non-transient computer readable medium, such as a program held in the data structure 76, hardcoded in firmware, or otherwise, to determine the weed zones 38 and/or plant zones 36.

It is also contemplated for the controller 74 to indicate a location of a corresponding weed zone 38 and/or a plant zone 36 via the visual display 92. For example, the controller 74 may illuminate a green LED when the electronic sensor 70 passes over a plant zone 36, and the controller 74 may illuminate a red LED when the electronic sensor 70 passes over a weed zone 38.

In addition, the controller 74 may actuate one or more ground engaging devices 79 in the weed zone 38 and/or the plant zone 36. Ground engaging devices could include one or more dispensers for dispensing agricultural products to the ground, such as dispensers 80, 82, and/or one or more mechanical instruments 84 for directly contacting the ground, such as a deployable digger, dragger, tiller, weeder, and the like. For example, the first dispenser 80 might dispense a first agricultural product suitable for the plant zone 36, such as a targeted fertilizer, pesticide, water, or the like. In addition, the second dispenser 82 might dispense a second agricultural product suitable for the weed zone 38, such as a targeted herbicide. Also, upon detection of the targeted weed zone 38 (or outside of the plant zone 36), the mechanical instrument 84 may be activated, such as to dig the soil to remove weeds.

It is further contemplated for the controller 74 to communicate information for steering, engine control and/or braking to drive system 86. For example, upon the electronic sensor 70 sensing physical locations of detectable elements 34 and communicating such information to the controller 74, the controller 74 may operate to ensure the agricultural implement remains on course and at the correct speeds for the agricultural treatment underway.

The controller 74 may also communicate information to a visual display 92, such as one or more Light Emitting Diodes (LED's) or a monitor. The controller 74 may also be configured to provide such visual information to another device in a wired or wireless fashion.

The system 24 may also include a Global Positioning System (GPS) sensor 88 for correlating GPS location tracking data with physical locations of detectable elements 34. In addition, the system 24 may also include a configuration module 90 for configuring the controller 74, the data structure 76, the electronic sensor 70 and/or other elements of the system 24 as desired. The configuration module 90 may be entirely wirelessly accessed via an antenna.

Many changes and modifications could be made to the invention without departing from the spirit thereof. The scope of these changes will become apparent from the appended claims.

We claim:

1. A system for an agricultural implement for use with a seed tape including a plurality of agricultural seeds and a plurality of detectable elements dispersed between the seeds, the system comprising:
    a ground engaging device;
    an electronic sensor for sensing a physical location of a first detectable element of the plurality of detectable elements of the seed tape and providing a resulting detection signal;
    a data structure storing a separation distance between at least one of seeds of the seed tape and detectable elements of the seed tape and storing a predetermined plant dimension for a seed of the seed tape; and
    a controller in communication with the electronic sensor and the data structure, wherein the controller is configured to determine at least one of a weed zone between seeds and a plant zone for a seed based on receiving the detection signal for the first detectable element and reading the separation distance and the predetermined plant dimension from the data structure, and
    wherein the controller is configured to actuate the ground engaging device in the at least one of a weed zone and a plant zone.

2. The system of claim 1, wherein detectable elements are dispersed at midpoints between seeds and the controller is configured to determine the at least one of a weed zone and a plant zone based on a midpoint.

3. The system of claim 1, wherein detectable elements are dispersed between groups of seeds and the controller is configured to determine the at least one of a weed zone and a plant zone based on a group of seeds.

4. The system of claim 1, wherein the detectable elements are Radio Frequency Identification (RFID) tags and the electronic sensor is a RFID interrogator that senses the RFID tags.

5. The system of claim 4, wherein at least one of the separation distance and the predetermined plant dimension is stored in an RFID tag which is read by the RFID interrogator and provided to the data structure.

6. The system of claim 1, wherein the detectable elements are magnets and the electronic sensor is a magnetometer that senses the magnets.

7. The system of claim 1, further comprising a visual display, and wherein the controller is configured to indicate a location of the at least one of a weed zone and a plant zone via the visual display.

8. The system of claim 1, wherein the ground engaging device is a dispenser for dispensing an agricultural product, the dispenser being in communication with the controller.

9. The system of claim 8, wherein the controller is configured to dispense via the dispenser at least one of a fertilizer and a pesticide in the plant zone.

10. The system of claim 8, wherein the controller is configured to dispense via the dispenser an herbicide in the weed zone.

11. The system of claim 1, wherein the ground engaging device is a mechanical instrument for removing weeds, wherein the mechanical instrument is in communication with the controller, and the controller is configured to activate the mechanical instrument in the weed zone.

12. A system for use with a seed tape including a plurality of agricultural seeds and a plurality of detectable elements dispersed between the seeds, the system comprising:

a dispenser for an agricultural product;

an electronic sensor for sensing a physical location of a first detectable element of the plurality of detectable elements of the seed tape and providing a resulting detection signal;

a data structure storing a separation distance between at least one of seeds of the seed tape and detectable elements of the seed tape and storing a predetermined plant dimension for a seed of the seed tape; and a controller in communication with the dispenser, the electronic sensor and the data structure, wherein the controller is operable configured to determine at least one of a weed zone between seeds and a plant zone for a seed based on receiving the detection signal for the first detectable element and reading the separation distance and the predetermined plant dimension from the data structure, and wherein the controller is configured to dispense via the dispenser the agricultural product in the at least one of a weed zone and a plant zone.

13. The system of claim 12, further comprising a visual display, wherein the controller is configured to indicate a location of the at least one of a weed zone and a plant zone via the visual display.

14. The system of claim 12, wherein the agricultural product is at least one of a fertilizer and a pesticide, and the controller is configured to dispense via the dispenser the agricultural product in the plant zone.

15. The system of claim 12, wherein the agricultural product is an herbicide, and the controller is configured to dispense via the dispenser the agricultural product in the weed zone.

16. The system of claim 12, wherein the electronic sensor is a RFID interrogator that senses detectable elements that are RFID tags, and at least one of the separation distance and the predetermined plant dimension is stored in an RFID tag and provided to the data structure.

17. A method for agriculture using a seed tape including a plurality of agriculture seeds and a plurality of detectable elements, the method comprising:

(a) sensing a physical location of a first detectable element of the plurality of detectable elements of the seed tape and providing a resulting detection signal;

(b) storing in a data structure a separation distance between at least one of seeds of the seed tape and detectable elements of the seed tape and storing a predetermined plant dimension for a seed of the seed tape;

(c) determining at least one of a weed zone between seeds and a plant zone from a seed based on receiving the detection signal for the first detectable element and reading the separation distance and the predetermined plant dimension from the data structure; and (d) actuating a ground engaging device in the at least one of a weed zone and a plant zone.

18. The method of claim 17, wherein step (d) comprises dispensing an agricultural product in the at least one of a weed zone and a plant zone.

19. The method of claim 18, wherein the agricultural product is at least one of a fertilizer and a pesticide, and the agricultural product is dispensed in a plant zone.

20. The method of claim 18, further comprising displaying a location of the at least one of a weed zone between seeds and a plant zone from a seed via a visual display.

* * * * *